United States Patent

Brueckmann et al.

[11] Patent Number: 5,534,166
[45] Date of Patent: Jul. 9, 1996

[54] PREPARATION OF CONDENSATES OF ARENESULFONIC ACIDS AND FORMALDEHYDE AND USE THEREOF

[75] Inventors: Ralf Brueckmann, Goennheim; Johannes P. Dix, Neuhofen; Rolf Fikentscher; Manfred Herrmann, both of Ludwigshafen; Norbert Zimmermann, Waldsee, all of Germany

[73] Assignee: BASF Aktiengesellschaft, Ludwigshafen, Germany

[21] Appl. No.: 37,392

[22] Filed: Mar. 26, 1993

Related U.S. Application Data

[63] Continuation of Ser. No. 900,742, Jun. 19, 1992, which is a continuation of Ser. No. 600,128, Oct. 22, 1990, abandoned, which is a continuation of Ser. No. 438,027, Nov. 20, 1989, abandoned.

[30] Foreign Application Priority Data

Dec. 14, 1988 [DE] Germany .............. 38 41 987.4

[51] Int. Cl.$^6$ ............ B01F 17/52; C09B 67/42; C08G 16/02
[52] U.S. Cl. ............ 8/557; 8/558; 8/58 D; 8/589; 8/594; 252/310
[58] Field of Search ............ 562/79, 89, 90; 8/557, 594, 558, 58 D, 94.24; 252/8.7, 558

[56] References Cited

U.S. PATENT DOCUMENTS

| | | | |
|---|---|---|---|
| 3,954,677 | 5/1976 | Law | 252/355 |
| 4,214,872 | 7/1980 | Uhrig et al. | 8/589 |
| 4,245,996 | 1/1981 | Schade et al. | 8/94.24 |
| 4,247,293 | 1/1981 | Würmli | 8/94.24 |

FOREIGN PATENT DOCUMENTS

| | | |
|---|---|---|
| 2122710 | 1/1971 | France . |
| 58-179218 | 4/1982 | Japan . |

*Primary Examiner*—Paul Lieberman
*Assistant Examiner*—Necholus Ogden
*Attorney, Agent, or Firm*—Oblon, Spivak, McClelland, Maier & Neustadt

[57] ABSTRACT

Condensates of arenesulfonic acids and formaldehyde are prepared by sulfonating arenes obtainable by thermal cracking of a naphthenic residue oil and fractional distillation of the cracked products of the fraction obtained at 100–120° C. under atmospheric pressure, sulfonating this aromatics fraction with oleum at 120°–160° C. using an amount of from 0.7 to 1.2 parts by weight of oleum having an $SO_3$ content of 24% by weight per part by weight of aromatics fraction, and subsequently condensing the arenesulfonic acids with formaldehyde in a conventional manner, and are used as dispersants, in particular for preparing dye formulations.

15 Claims, No Drawings

PREPARATION OF CONDENSATES OF ARENESULFONIC ACIDS AND FORMALDEHYDE AND USE THEREOF

This is a Continuation, of application Ser. No. 07/900,742, filed Jun. 19, 1992, which is a Continuation of application Ser. No. 07/600,128, filed Oct. 22, 1990, now abandoned, which is a Continuation of Ser. No. 07/438,027, filed Nov. 20, 1989, now abandoned.

Condensates of arenesulfonic acids, in particular α- and β-naphthalenesulfonic acids, have been known for a long time. DE-C-1,137,005 discloses a process for preparing condensation products of α- and β-naphthalenesulfonic acid and also methylnaphthalenesulfonic acids and the corresponding naphthalenedisulfonic acids with aldehydes. The condensation is carried out at from 100° to 200° C. under superatmospheric pressure. The condensation products thus obtainable are used as auxiliaries in tanning, as dispersants for dyes, and in papermaking to avoid resin problems.

U.S. Pat. No. A 3,277,162 discloses the preparation of water-soluble condensation products of naphthalenesulfonic acids and formaldehyde. According to this patent specification, initially naphthalene is sulfonated with concentrated sulfuric acid, eg. 96% strength sulfuric acid, at from 70° to 175° C. The products are, depending on the reaction temperature, 1- and 2-naphthalenesulfonic acids. The ratio of the isomers in the mixture of the two naphthalenesulfonic acids is not critical for the preparation of condensation products with formaldehyde. The condensation products thus obtainable are used as surfactants or as retarders in the dyeing of acrylic fibers.

JP-A2-83/179,218 discloses a process for preparing condensation products of naphthalenesulfonic acids and formaldehyde wherein naphthalene is sulfonated with fuming sulfuric acid and the sulfonation products are then condensed with formaldehyde under an inert gas. Pure naphthalene is preferably used in this process, but it is also possible to use an alkylnaphthalene. The products thus prepared are useful as dispersants for cement.

DE-C-2,745,449 discloses stable finely dispersed aqueous preparations of disperse dyes and of sparingly water-soluble or water-insoluble fluorescent whitening agents which contain dispersants comprising sulfonated addition products of alkylene oxides to specific phenols. The finely disperse preparations of disperse dyes described therein permit perfectly level package dyeings without dye being filtered out during dyeing. As stated in this reference, apart from the dispersants described therein, the only other suitable dispersants for package dyeings are ligninsulfonates.

Ligninsulfonates, however, are not effective with all dyes, and they have a propensity to reduce sensitive azo dyes during dyeing, so that much reduced color yields are obtained. Particularly unfavorable dye preparations for package dyeings contain condensation products of naphthalenesulfonic acid and formaldehyde as dispersants.

It is an object of the present invention to provide a process for preparing condensates of arenesulfonic acids and formaldehyde to obtain condensation products which, unlike prior art condensation products of this type, permit the preparation of stable dye formulations which produce perfectly level package dyeings without the dye being filtered out during dyeing.

We have found that this object is achieved by a process for preparing a condensate of an arenesulfonic acid and formaldehyde by sulfonating an arene and condensing the arenesulfonic acid with formaldehyde in an aqueous medium by:

(a) sulfonating an arene compound obtainable by thermal cracking of a naphthenic residue oil and fractional distillation of the cracked products of the fraction obtained at 100°–120° C. and 1013 mbar, (b) with oleum at from 120° to 160° C.

(c) using from 0.7 to 1.2 parts by weight of oleum having an $SO_3$ content of 24% by weight per part by weight of the arene obtained as described in (a).

The condensation products thus preparable are useful dispersants which permit the preparation of aqueous dye formulations which are stable to storage over a prolonged period and which can even be used for preparing level package dyeings without dye being filtered out during dyeing.

The arene to be sulfonated is obtainable by thermal cracking of a naphthenic residue oil and fractionating the cracked products. Naphthenic residue oils are obtained for example in the cracking of light naphtha. They are also referred to, for example in DE-A-2,947,005, as high-boiling aromatic hydrocarbon oils.

The naphthenic residue oil is preferably thermally cracked at 1,400° to 1,700° C. The cracked products are subjected to fractional distillation. The fraction which boils under atmospheric pressure (1,013 mbar) at 100°–120° C. is collected and sulfonated. This fraction is customarily obtained as a by-product in the known acetylene oil quench process; cf. Ullmann's Encyclopedia of Industrial Chemistry, VCH Verlagsgesellschaft mbH, Weinheim, 1985, volume 71, pages 107–112 (incorporated by reference).

This aromatics fraction is a mixture of many aromatic substances whose structures and concentrations cannot in practice be determined in detail. The following arenes are the chief representatives of this aromatics fraction:

|  | % by weight of aromatics fraction |
| --- | --- |
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction also contains as identified ingredients amounts of from 0.1 to 2% by weight of the following arenes: acenaphthene, fluorene, indan, methylstyrene, phenanthrene, methylindan, dimethylnaphthalene, ethylnaphthalene, xylenes, tetralin, styrene, methylethylbenzene, anthracene, fluoranthrene, pyrene, acetnaphthalene and toluene.

The preferred aromatics fractions for sulfonation contains from 40 to 45% by weight of naphthalene. The above-described fraction of arenes which is a mixture of many aromatic substances is sulfonated with oleum at from 120° to 160° C., preferably at from 135° to 145° C. The higher the temperature, the shorter the reaction time required. For example, at 145° C. the sulfonation ends within a period of from 1.6 to 2.6 hours, while at 140° C. the sulfonation takes from 2.25 to 4 hours and at 135° C. from 3.25 to 6 hours. A higher molar excess of oleum, based on the naphthalene present in the aromatics fraction, likewise leads to a shortening of the reaction time. For example, a 10% molar excess of oleum at a constant temperature of 140° C. requires a reaction time of 2.45 to 4 hours, while with a 20% excess of oleum at the same temperature the reaction time required is from 1.4 to 3 hours.

The conditions under which the aromatics fraction obtained in (a) is sulfonated are such that the naphthalene present therein is converted into α- and β-naphthalenesulfonic acids in an α:β ratio of preferably from 10:1 to 1:2. The amount used of oleum as fuming sulfuric acid having an $SO_3$ content of 24% by weight is from 0.7 to 1.2 parts by weight per part by weight of the arene obtained as described in (a). It is of course also possible to use sulfuric acid of another $SO_3$ content, for example oleum containing from 10 to 65% by weight of $SO_3$. If the $SO_3$ content of the oleum is lower, the sulfonation requires in proportion to the $SO_3$ content a higher amount of oleum than if 24% strength of oleum is used, while correspondingly less is required of a more concentrated oleum. The amount of oleum depends on its $SO_3$ content. The specified sulfonation temperature and amount of oleum per arene (a) lead to sulfonation products which contain α- and β-naphthalenesulfonic acid in a ratio of 20:1 to 1:3, preferably from 10:1 to 1:2.

The sulfonated arene is subsequently condensed with formaldehyde in a conventional manner. For this purpose, it is possible to start directly from the sulfonation mixture, dilute it with water and condense it with formaldehyde at from 90° to 105° C. by the addition of formaldehyde. The condensation may of course also be carried out under superatmospheric pressure at from 105° to 150° C. The condensation reaction requires about 4–12 hours, preferably 7–9 hours. From 0.07 to 0.17 part by weight of formaldehyde (calculated as 100% strength) is used in the condensation per part by weight of arene (a). The formaldehyde is preferably used in the condensation as a 10–50% strength aqueous solution. After the condensation reaction has ended, the reaction mixture is neutralized. This may be done with sodium hydroxide solution, potassium hydroxide solution, calcium hydroxide, sodium carbonate or sodium bicarbonate. The pH of the solution which contains the condensate is adjusted to 6–11. This solution can be used directly as a dispersant. However, it is also possible to isolate the condensation product therefrom in pure form or by spray drying the solution. The condensation product is readily water-soluble, and is suitable in particular for use as a dispersant in dye formulations. 100 parts by weight of dye requires from 8 to 500, preferably from 25 to 400, parts by weight of condensation product.

In the Examples, parts and percentages are by weight.

All the Examples were carried out using arenes obtained by fractional distillation of the cracked product of naphthenic residue oil fraction passing over at 100°–120° C. under atmospheric pressure (1,013mbar). The thermal cracking of the naphthenic residue oil was carried out at from 1,400 to 1,700° C. The mixture of arenes obtained in the fractional distillation of the cracked products was found to contain in detail the following substances:

| Compound | % |
|---|---|
| Naphthalene | 44.60 |
| 2-Methylnaphthalene | 10.00 |
| 1-Methylnaphthalene | 6.20 |
| Indene | 7.40 |
| Biphenyl | 2.20 |
| Methylindene | 1.95 |
| Acenaphthene | 1.70 |
| Fluorene | 1.30 |
| Indan | 1.22 |
| Phenanthrene | 1.10 |
| Methylindan | 1.10 |
| Dimethylnaphthalene | 1.13 |
| Ethylnaphthalene | 0.82 |
| p- and m-xylenes | 0.80 |
| Tetralin | 0.80 |
| Styrene | 0.60 |

EXAMPLE 1

128 parts of the mixture of the above-described arenes were introduced into a heatable reaction vessel equipped with a stirrer and heated to 70° C. with stirring. 108 parts of oleum having an $SO_3$ content of 24% were then added in the course of 1.5 hours during which the temperature was not allowed to rise above 75° C. After the oleum had been added, the reaction mixture was stirred at 90° C. for 2 hours and then at 135° C. for 5.5 hours. It was then cooled down to 70° C., 150 parts of water were added, followed by 50 parts of 30% strength aqueous formaldehyde, and the mixture was condensed by heating at 100° C. for 8 hours. 167 parts of water were then added, followed by 51 parts of 50% strength aqueous sodium hydroxide solution. 83 parts of a 26% strength aqueous solution of calcium hydroxide were then added, producing a pH of 4.5. The reaction mixture was filtered, and the pH of the filtrate was subsequently adjusted to 10.5 by adding 45 parts of 18% strength aqueous sodium carbonate solution and 10 parts of 50% strength aqueous sodium hydroxide solution. The mixture was then stirred at 90° C. for 1 hour and admixed with 25 parts of a 20% strength aqueous sulfuric acid, which brought the pH to 8.5. The solution was filtered once more. It had a solids content of 28.5%.

In the sulfonated product, the ratio of α-naphthalenesulfonic acid to β-naphthalenesulfonic acid was 1:1.4.

EXAMPLE 2

Example 1 was repeated, except for the differences that this time 118 parts of oleum having an $SO_3$ content of 24% were used and this time the sulfonation was carried out at 135° C. not for 5.5 hours but for only 4.5 hours. The ratio of α-naphthalenesulfonic acid to β-naphthalenesulfonic acid in the sulfonated product was 1:1.2. The aqueous solution of the dispersant had a solids content of 26%.

EXAMPLE 3

Example 1 was repeated, except that the reaction mixture was sulfonated by heating to 140° C. for 2 hours. In the sulfonated mixture, the ratio of α-naphthalenesulfonic acid to β-naphthalenesulfonic acid was 1:1. The method indicated in Example 1 was also slightly modified by adding to the reaction mixture, after the condensation, 104 parts of 50% strength aqueous sodium hydroxide solution, bringing the reaction mixture pH to 11, and then after stirring at 90° C. for one hour reducing the pH to 8.5 by adding 21 parts of concentrated hydrochloric acid. The dispersion thus obtained had a solids content of 25%. The ratio of β-naphthalenesulfonic acid to β-naphthalenesulfonic acid was 1:1.

COMPARATIVE EXAMPLE 1

Example 1 was repeated, except that the sulfonation was carried out with 157 parts of a 98% strength sulfuric acid. In this case, the ratio of α- to β-naphthalenesulfonic acid was 1:5.3.

APPLICATION EXAMPLES

EXAMPLE 4

20 parts of the blue disperse dye of Colour Index No. 11345 (based on the dry weight) in the form of an aqueous press cake were pasted up in a high-speed stirrer with 15 parts (calculated on the solids content) of a dispersant prepared in Example 1, 10 parts of sorbitol as a 70% strength aqueous solution, 5 parts of propylene glycol, 1 part of a commercial biocide (1,2-benzisothiazolin- 3-one as a 9.5% strength solution in propylene glycol) and water to a total weight of 100 parts, the paste was sand-milled until very finely dispersed. The pH of the dye dispersion was 8. The degree of dispersion of the dye was determined by means of the whirler test (Richter and Vescia, Melliand Textilberichte 6 1965, 622) and with the aid of the filter test (Schlottmann, Textilpraxis 1 1957, 63). The whirler value was: 2/3/25/70.

The dye preparation obtained was mobile and polyester fibers and fabrics by any of the conventional dyeing processes. In the thermosoling of polyester/cotton blend fabrics, in particular, the dye preparation was notable for a high cotton reserve. When dyeing packages of textured polyester fibers there were no dye deposits whatsoever on the yarn.

COMPARATIVE EXAMPLE 2

Example 4 was repeated, except that the dispersant used in Example 4 was replaced by the dispersant prepared in Comparative Example: 1. Again, it is true, a stable dye preparation was obtained, but under the conditions of package dyeing it became unstable and left thick dye deposits on the inner surface and the end surfaces of the yarn package.

EXAMPLE 5

17 parts of the yellow disperse dye of Colour Index No. 47023 (based on the dry weight) in the form of the water-moist press cake were pasted up in a high-speed stirrer with 12 parts (based on the solids content) of the dispersant prepared as described in Example 3, 15 parts of glycerol, 1 part of the biocide mentioned in Example 1 and water to a total weight of 100 parts. The pH of the dye preparation was 8. The mixture was subsequently bead-milled until a good whirler value was obtained. The whirler value obtained was 6/9/22/63.

The preparation thus obtained was mobile and stable to storage, and proved highly suitable for dyeing polyester fibers and fabrics by any conventional dyeing process. In the dyeing of polyester/cotton blend fabrics, this dye formulation led to very little staining of the cotton portion, the dye deposited on the cotton fiber being readily washed off. The formulation was also highly suitable for dyeing packages of textile polyester fiber.

EXAMPLE 6

60 parts (calculated on the dry content) of the blue disperse dye described in Example 1 in the form of a water-moist press cake were pasted up with 40 parts, based on the solids content, of the dispersant prepared as described in Example 2, and 50 parts of water, and sand-milled until very finely dispersed. The degree of dispersion was checked with the aid of the whirler test. The whirler value was 4/13/25/58. 50 parts of a 26% strength aqueous solution of the dispersant obtained as described in Example 2 were then added, producing a dispersion having a solids content of 25%. This dispersion was dried in a spray dryer at a gas inlet temperature of 120° C.

The dye powder obtained in the process had the degree of fine dispersion achieved in the wet milling stage. On stirring into water, a stable dyeing liquor was obtained, which even under HT dyeing conditions did not give rise to flocculation and was very highly suitable not only for dyeing packages of textured polyester fibers but also for thermosoling polyester/cotton blend fabrics, staining the cotton fibers only to a very slight degree. The disperse dye was very readily washed off the cotton fiber.

We claim:

1. A dye formulation containing 100 parts by weight of a dye and from 8 to 500 parts by weight; of a dispersing agent, said dispersing agent prepared by a process consisting essentially of the steps of:
   (a) thermally cracking a naphthenic residue oil to obtain a cracked product and then fractional distilling said cracked product to obtain an arene compound composition distilling at 100°–120° C. and 1013 said composition comprising 30 to 55 wt. % naphthalene, at least about 9 wt. % methyl naphthalene and at least about 3 wt. % indene,
   (b) sulfonating said arene compound composition with oleum at from 120° to 160° C.,
   (c) using from 0.7–1.2 parts by weight of oleum having an $SO_3$ content of 24% by weight per part by weight of said arene compound composition, and
   (d) condensing the arene sulfonic acid thus obtained with formaldehyde in an aqueous medium.

2. The dye formulation of claim 1, containing 25–400 parts by weight of said dispersing agent per 100 parts by weight of said dye.

3. The dye formulation of claim 1, wherein said dye is blue disperse dye Color Index No. 11345.

4. The dye formulation of claim 1, wherein said dye is yellow disperse dye Color Index No. 47023.

5. The dye formulation of claim 1, comprising step (c) using 0.8–0.9 parts by weight of oleum having an $SO_3$ content of 24% by weight per part by weight of said arene compound composition.

6. The dye formulation of claim 1, wherein said condensing step (d) is conducted using 0.07–0.17 parts by weight of formaldehyde calculated as 100% strength, per part by weight of said arene compound composition.

7. The dye formulation of claim 1, wherein said sulfonating step (b) is conducted at a temperature of 120°–135° C.

8. The dye formulation of claim 1, wherein said arenesulfonic acid comprises a ratio of α-naphthlenesulfonic acids/β-naphthlenesulfonic acids of from 20:1 to 1:3.

9. The dye formulation of claim 8, wherein said ratio is from 10:1 to 1:2.

10. The dye formulation of claim 1, wherein said thermal cracking is conducted at a temperature of 1,400°–1,700° C.

11. The dye formulation of claim 4, wherein said arene compound composition comprises 40–45 wt. % naphthalene.

12. The dye formulation of claim 11, wherein said arene compound composition further comprises 5–15 wt. % 2-methylnaphthalene.

13. The dye formulation of claim 11, wherein said arene compound composition further comprises 4–10 wt. % 1-methylnaphthalene.

14. The dye formulation of claim 11, wherein said arene compound composition further comprises 3–10 wt. % indene.

15. A method of improving the dispersibility of a dye by admixing with said dye, a dispersing agent prepared by a process comprising the steps of:
   (a) thermally cracking a naphthenic residue oil to obtain a cracked product and then fractional distilling said cracked product to obtain an arene compound composition distilling at 100°–120° C. and 1013 mbar,
   (b) sulfonating said arene compound composition with oleum at from 120° to 160° C.,
   (c) using from 0.7–1.2 parts by weight of oleum having an $SO_3$ content of 24% by weight per part by weight of said arene compound composition, and
   (d) condensing the arenesulfonic acid thus obtained with formaldehyde in an aqueous medium.

\* \* \* \* \*